Patented July 29, 1941

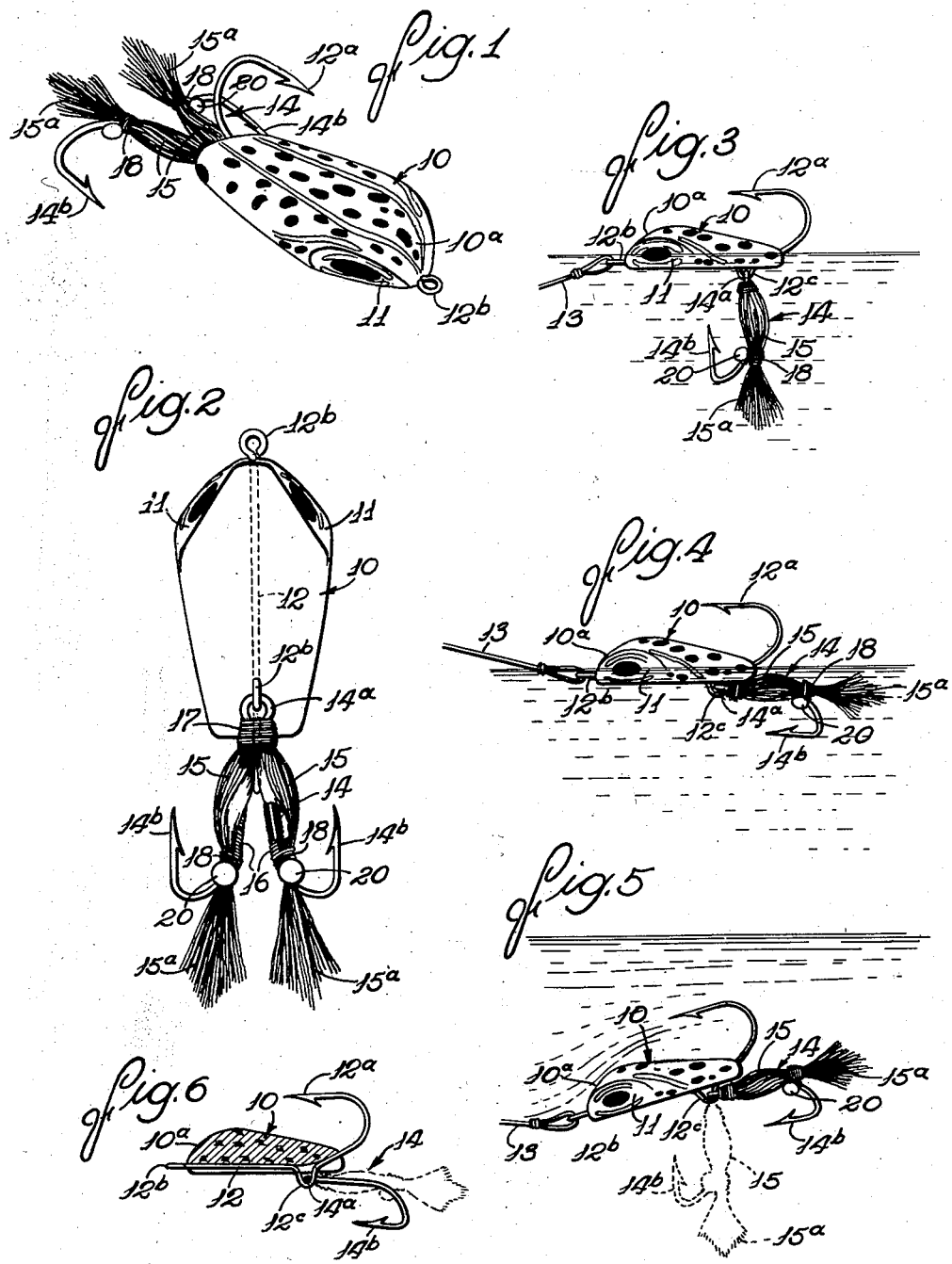

2,250,478

UNITED STATES PATENT OFFICE 2,250,478

ARTIFICIAL BAIT

Wayne M. Franks, Rockford, Ill.

Application September 11, 1939, Serial No. 294,236

7 Claims. (Cl. 43—42)

The invention relates to a novel form of artificial bait adapted to simulate a swimming frog.

The general object is to provide a frog bait of the above character which is simple and inexpensive in construction, durable in operation and very realistic in its action.

Another object is to provide a frog bait having legs adapted to be actuated in a novel manner as an incident to manipulation of the fishing line.

A more detailed object of the invention is to provide such an artificial bait in which a standard double hook is arranged in a novel manner to simulate the appearance and motion of a frog's hind legs when the bait is in use.

Further objects and advantages of the invention will become apparent as the following description proceeds, taken in connection with the accompanying drawing, in which Figure 1 is a general perspective view of an artificial bait embodying the invention.

Fig. 2 is an underside view of the bait.

Figs. 3 and 4 are side views of the bait showing different positions of the bait in use.

Fig. 5 illustrates the diving action which may be produced.

Fig. 6 is a longitudinal sectional view with the leg covering omitted.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

The improved bait includes a body 10 made of buoyant material such, for example, as molded cork. The underside of the body is substantially flat and painted a light color to simulate the belly of a frog, while the curved back or top is painted a suitably speckled green. The head is slightly enlarged, tapering sharply to the nose (Fig. 2) and rising steeply with the forehead 10ª inclined for a purpose to appear later. From the head, the body tapers more gradually to the rear, both laterally and longitudinally. This shape aids in balancing the bait horizontally when it rests on the water (Fig. 3) and also in causing it to dive (Fig. 5) when pulled rapidly through the water.

The side faces 11 (Figs. 1 and 2) of the head are shaped to face slightly downward and are painted to simulate the eyes of a frog. This contributes materially to the life-like appearance of the bait.

Extending longitudinally of the body 10 is a hook 12 (Fig. 6) which may, for simplicity of construction, have its shank molded into the body 10 during the formation of the latter. The barbed end 12ª of this hook is curled up over the back of the body 10 and the eye 12ᵇ (Figs. 1 and 2) is located at the nose of the body for attachment to the usual leader 13 (Fig. 3). It will be seen that the hook 12 is of standard form except that a loop or offset 12ᶜ is formed in its shank to project beneath the under surface of the bait body.

In accordance with one aspect of the invention, a conventional double hook 14 (Figs. 2 and 6) is arranged to simulate in appearance and motion the hind legs of a frog. This hook has the usual pair of spaced shanks joined by and diverging from an eye 14ª and terminating in oppositely curved barbed ends 14ᵇ. The eye encircles the loop 12ᵇ so as to suspend the hooks pivotally at the proper point on the underside of the body 10. By thus joining the hooks 12 and 14, the body 10 is relieved of all of the strains incident to hooking and playing a fish.

Resemblance to the hind legs of a frog is effected by extending suitable coverings 15 along the shanks of the hooks 14 with their ends 15ª projecting a substantial distance beyond the hooks proper. While the coverings may be of various materials, it is preferred to employ tufts of hair of several colors including green, white and brown. The hook shanks may first be wrapped with cord 16 which is utilized to fasten the hair to the shanks adjacent the eye 14ª and near the outer ends of the shanks as indicated at 17 and 18 respectively. The hairs intermediate these points of attachment may be bent to impart some bulkiness to the upper parts of the simulated frog legs. The projecting ends 15ª are preferably splayed out and trimmed as shown to resemble the shape of a frog's foot.

By locating the point of pivotal connection between the eye 14ª and the loop 12ᶜ a short distance in from the rear end of the body 10, proper balance will be obtained to cause the simulated legs to hang down from the body in substantially vertical position (see Fig. 3) when the bait is resting idly on the water surface. If desired, the hooks 14 may be weighted slightly as indicated at 20.

To resemble a frog's hind legs, the tufts 15 of suitably dyed hair are fixed to the double hook.

These tufts offer sufficient resistance to movement. Now as the bait is pulled forwardly along the water surface from the position of Fig. 3 to that shown in Fig. 4, the resistance offered by the legs to movement through the water causes them to be swung rearwardly and upwardly to a substantially horizontal position. Then, as the bait looses its forward motion, the double hook again sinks toward its vertical position. Thus, by pulling the bait forward intermittently with short intervening dwell periods, the simulated legs will swing up and down alternately thereby closely simulating the leg action of a live frog in swimming.

When the pulls are relatively gentle and properly spaced, the bait body will remain on the surface of the water. To cause the bait to dive and further simulate the appearance of a frog disporting itself in the water, the angler pulls on his line more sharply. As heretofore noted, the steeply inclined forward head 10ᵃ and flat bottom contour of the bait body results, in such case, in causing the bait to dive momentarily beneath the water with the double hook 14 trailing out behind as shown in Fig. 5. Then, as the bait loses its momentum, the simulated legs swing downwardly as before and the bait starts to rise. By proper timing of the jerks, the bait may be kept submerged while at the same time producing the very realistic swimming action of a live frog.

I claim as my invention:

1. An artificial bait comprising, in combination, a buoyant body fashioned and decorated to simulate the body of a frog, a hook projecting from the rear of said body and having a shank extending longitudinally thereof and provided with a loop beneath the body near the rear end thereof, a double hook having an eye pivotally connected to said loop and diverging shanks dangling loosely beneath said body, and tufts of hair fixed to and extending along said shanks and beyond the hook ends to simulate the hind legs of a frog, said double hook and tufts resisting movement through the water so as to swing upwardly into a trailing position behind said body while the latter is pulled through the water.

2. In an artificial bait of the type described, the combination of a buoyant body simulating the appearance of a frog, a hook having a shank-portion extending longitudinally of said body and fixed thereto, said shank-portion of the hook having a loop therein, a conventional double hook having an eye pivotally connected to said loop and diverging shanks freely suspended beneath said body, and means fixed to said shanks to swing therewith and simulate a frog's hind legs and to resist motion of the latter through the water.

3. An artificial frog bait comprising a buoyant body simulating the head and body of a frog and having a fixed point of attachment with a line by which the body may be pulled through a body of water, a forked member pivotally suspended from the underside of said body near the rear end thereof so as to hang downwardly when the body is floating idly and to move independently of said line, and means extending along the forks of said member to simulate the hind legs of a frog and resist movement of the member through the water whereby to cause the member to swing upwardly as the bait is pulled through the water and downwardly when the forward motion is arrested.

4. An artificial bait comprising, in combination, a buoyant body fashioned to simulate the body of an animal and shaped to present a substantially flat bottom surface and a curved top surface presenting a steeply inclined forehead to cause the body to dive beneath the water when pulled forward by a line attached to the nose, and a double hook hanging freely from the lower side of the rear portion of said body and swingable independently of relative movement between the body and a pull line attached thereto, and means on said hook adapted to resist motion through the water whereby to cause the hook to swing upwardly and rearwardly as the bait is pulled through the water.

5. In an artificial bait of the type described, the combination of a buoyant body fashioned to simulate the body of a frog, said body being substantially flat and light colored on the bottom with an enlargement on its upper side adjacent the forward end, the head of said body having side surfaces, converging toward said bottom and being decorated to simulate a frog's eyes, and a hook pivotally supported to swing beneath said body and simulate the legs of a frog.

6. An artificial frog bait comprising a buoyant body simulating the head and body of a frog and adapted to be attached to a pull line at a fixed point near its forward end, a double hook pivotally suspended from the rear end portion of said body so as to hang downwardly when the body is floating idly, and means extending along the shanks of said double hook and projecting beyond the hook ends thereof to simulate the hind legs of a frog and resist movement of the hook through the water whereby to cause the hook to swing upwardly as the bait is pulled through the water.

7. An artificial bait comprising a buoyant body simulating the head and body of an animal and adapted to be attached at its forward end to a pull line, a double hook pivotally suspended from the under side of said body at a point spaced forwardly from the rear end of the body so as to swing without relative movement between the body and said line and hang downwardly when the body is floating idly, and means extending along the shanks of said double hook and projecting beyond the hook ends to simulate the hind legs of an animal, said last mentioned means acting as the body is pulled forwardly through the water to resist movement of the hook and cause the latter to swing upwardly.

WAYNE M. FRANKS.